Nov. 7, 1939.  P. L. TEA  2,179,000

AREA MEASURING DEVICE

Filed Jan. 7, 1938　　3 Sheets-Sheet 1

INVENTOR
PETER L. TEA
BY
ATTORNEYS.

Nov. 7, 1939.                    P. L. TEA                    2,179,000
                          AREA MEASURING DEVICE
                          Filed Jan. 7, 1938            3 Sheets-Sheet 2

INVENTOR
PETER L. TEA
BY
ATTORNEYS.

Nov. 7, 1939.  P. L. TEA  2,179,000
AREA MEASURING DEVICE
Filed Jan. 7, 1938   3 Sheets-Sheet 3

INVENTOR
PETER L. TEA
BY
ATTORNEYS.

Patented Nov. 7, 1939

2,179,000

UNITED STATES PATENT OFFICE 2,179,000

AREA MEASURING DEVICE

Peter L. Tea, Yonkers, N. Y.

Application January 7, 1938, Serial No. 183,787

20 Claims. (Cl. 33—1)

This invention relates to area-measuring devices.

An object of this invention is a device for measuring areas having irregular shapes by comparing the amount of transmitted or reflected light from an area of the same shape and size or known proportionate size as the area to be measured, with the quantity of transmitted or reflected light of a predetermined unit or standard area.

The device may be arranged to provide a direct measurement of the desired area, or may be arranged to provide a measurement of any desired fraction or multiple of the area. The latter arrangement adapts the device for use as a harmonic analyzer to determine the coefficients of a Fourier series and other mathematical equations.

In one embodiment of my invention the device may comprise a light-tight box at one end of which is placed a photo-electric cell or other light-sensitive device. Means are provided at the opposite end for producing a uniform light source, at least as large in area as the cross-section of the box. Every light sensitive point of the photo-electric cell receives the same solid angle of light subtended by the area of the box opening and the total quantity of light received by the photo-electric cell is proportional to such area. A galvanometer or other suitable measuring instrument is connected to the photo-electric cell either directly or through suitable amplifier circuits and indicates the amount of light received by the cell. Preferably the response characteristics of the galvanometer and associated circuits should be directly proportional to the amount of light received. In other words, straight line characteristics are desired. A transparency or light transmitting portion shaped like that of the area to be measured may be placed at the box opening, and by comparing the galvanometer reading with that of a standard area transparency placed at said opening either before or after the area being measured, the area of the latter may be readily determined. Thus, if the reading with the standard transparency is $R_1$ and that with the area measured is $\frac{1}{2} R_1$ we know that the measured area is one-half that of the standard.

The harmonic analysis of sound waves, electric waves, etc., into Fourier series components is frequently desired and the presently known mathematical methods of analyses by calculation, are extremely complicated, time-consuming, tedious, and very often inaccurate. Such analyses, however, may be quickly made with the device of my invention, involve a minimum of mathematical computations and are highly accurate. Another object of my invention, therefore, is the adaptation of my comparator device to harmonic analysis by the use therewith of novel shaded analyzing areas or screens, or translucent or otherwise light transmitting areas provided with properly arranged opaque regions to facilitate the analysis.

With the above and other objects of invention in view as will hereinafter appear, my invention comprises the novel device, auxiliary apparatus associated therewith and method of application thereof to curve analysis as will be hereinafter more fully described and claimed.

In the accompanying drawings forming part of this specification, and in which similar reference characters denote corresponding parts.

Figures 1, 1A, 2, 3:
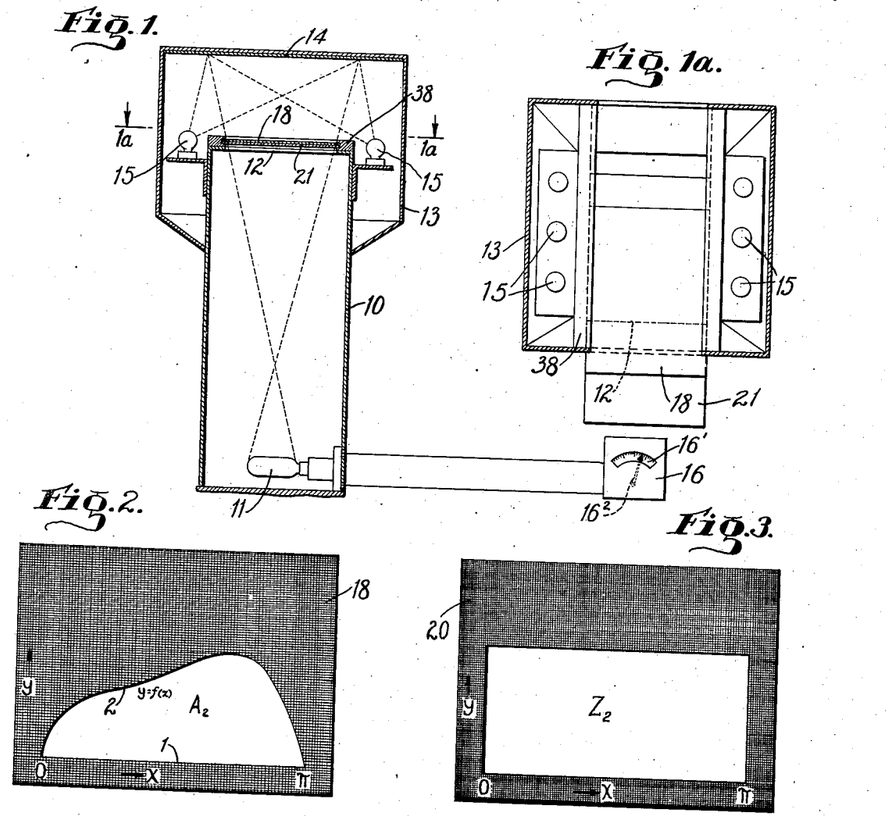
Fig. 1 is a diagrammatic sectional side elevation of a device adapted for use in accordance with my invention.
Fig. 1a is a section along lines $1a—1a$ of Fig. 1 seen in the direction of the arrows.
Fig. 2 illustrates a screen provided with a light transmitting area proportion to that under a curve to be analyzed.
Fig. 3 illustrates a standard screen having a known light transmitting area.

As disclosed in Fig. 1, the apparatus comprises a box 10 closed at its lower end, and provided at such end with a photo-electric cell 11 or other light responsive device. If desired, the box may be tapered longitudinally. The upper end is provided with a transparent or translucent closure 12 having a known area and spaced therefrom is a wide mat surface 14 located on the under face of the opaque hood 13. The mat 14 is uniformly illuminated from a suitable light source or sources 15 and supplies reflected light from mat 14 for actuation of the photo-electric cell 11. Each light sensitive point of the photo-electric cell 11 receives the same solid angle of light subtended by the area 12 and, according to Lambert's law, the total quantity of light received by the cell 11 is proportional to the area 12. A galvanometer 16 is connected directly to the photo-electric cell 11 and may have a suitably calibrated dial 16' on which its pointer 16² will indicate the quantity of light received by such cell. If the galvanometer is not sensitive enough suitable amplifier may be employed. The mat surface 14 is white or other suitable light color and is not shiny serving to reflect the light uniformly.

In the use of this device an opaque screen 18 having a black surface is provided which has a translucency transparency or a cut-out therein whose area $A_2$ of the same size and shape as the area which is to be measured, or with a transparency, translucency or a cut-out portion of the same shape and any known fraction or multiple of the original area, is placed over the closure 12 of the box 10. Light from mat 14 may only pass through the light transmitting portion and the reading of galvanometer 16 will be proportional to the area of the cut out as long as the distance between the ends of the box is large as compared to the dimensions of the opening 12 and the light from the mat 14 is uniform. The transparent, translucent, or cut out area is measured irrespective of how complex the pattern is and irrespective of whether there are opaque spots in the area. If the transparent, translucent or cut out area is identical in size and shape with the area measured, the relative reading of the galvanometer as compared with its reading without the screen indicates the area measured by the formula.

$$A_2 = A_1 \frac{R_2}{R_1}$$

where
$A_1$ = area of opening 12.
$A_2$ = measured area.
$R_1$ = galvanometer reading without the screen.
$R_2$ = galvanometer reading with the screen.

As a matter of fact, a direct reading of $A_2$ can be obtained from the galvanometer, if needle 16² is adjusted to give full scale deflection without the screen 18 and the scale graduations are provided with area indicia at other than full scale deflection. Thus, if the area of opening 12 were 100 square inches, for example, the scale could be uniformly graduated into one square inch markings with numerals at the tens indicating 10, 20, 30, etc., square inches. Full scale deflection for any number of square inches could, of course, be provided along with corresponding changes in the graduation markings to suit any desired set of circumstances.

The adaptation of my device for use as a harmonic analyzer is based upon the following facts.

A complex wave form $y = f(x)$ may be expressed as a Fourier series as follows:

(1) $y = f(x) = A_1 \sin x + A_2 \sin 2x + A_3 \sin 3x +$
$- \text{to } \infty + \frac{B_o}{2} + B_1 \cos x + B_2 \cos 2x + - \text{to } \infty$ or (2) $y = f(x) = A_1 \sin x + A_2 \sin 2x + A_3 \sin 3x + - \infty$ or (3) $y = f(x) = \frac{B_o}{2} + B_1 \cos x + B_2 \cos 2x + - \infty$ As is well known the values of the coefficients $A_n$ and $B_n$ are, for any curve (with restrictions) either a mathematical expression or an experimental curve.

(4) $A_n = \frac{2}{\pi} \int_0^\pi f(x) \sin nx \, dx$ (5) $B_n = \frac{2}{\pi} \int_0^\pi f(x) \cos nx \, dx$ (6) $B_o = \frac{2}{\pi} \int_0^\pi f(x) dx$ where $\pi$ is the value 3.1416—; $n$ is any integer from 1 to infinity and A and B are respectively coefficients of the sine and cosine harmonics.

The value of $B_o$ could be determined directly by the use of a planimeter because Equation 6 is simply twice the area under the curve divided by $\pi$.

A complicated mathematical method of evaluating these quantities known as the Fischer-Hinnen method is available and is described in Lawrence's book, Principles of Alternating Currents, first edition. The illustrated example in that text of the analysis of a wave containing only odd harmonics covers many solidly printed pages without including the side computations used in arriving at the printed figures. The method, furthermore, relies upon actual physical measurement of various ordinates along the curve and is thus at best only an approximate approach to the solution. With my apparatus and method of analysis, much more accurate results are obtained, and the computations reduced to a very few simple division operations which completely replace the multiple solution of simultaneous equations used in the Fischer-Hinnen method.

Primarily my device depends for its operation upon the well-known principle that the area under any curve $y = f(x)$ can be determined by subdividing the area into $n$ rectangles of width $dx$ and summing the areas of the individual rectangles within the limits of the area. For example, if the $x$ coordinate of a curve is made $\pi$ units long and subdivided into 20 smaller lengths $$\frac{\pi}{20}$$

units long, the area of each rectangle is $$\frac{\pi}{20} \cdot y_m$$

where $y_m$ is the value of the $y$ coordinate at the midpoint of the corresponding small rectangle. The total approximate area under the curve may, therefore, be expressed as (7) Approximate area $= \frac{\pi}{20} \cdot (y_1 + y_2 + \cdots y_{20})$ The expression for the exact area under the curve is (8) $A = \int_0^\pi f(x) dx$ which is the value of the limit of Equation 7 as the $x$ span, i. e., $\pi$ is divided into a larger and larger number of smaller parts.

These facts, as will hereinafter appear, are useful in harmonic analyses and to analyze any given curve, I provide the measuring screen 18 which may be of glass, metal, plastic composition or any suitable material. The faces of this screen are preferably perfectly black and designed to reflect little or preferably no light. If of glass, a transparent or translucent area $A_2$ is provided therein having the shape and size of the curved area to be analyzed. The base 1 of this area represents the $x$ coordinates of the area and the curved border 2 the curve whose equation is $y = f(x)$.

A second or standard screen (Fig. 3) 20 is provided of the same material as screen 18 whose faces, too, are black. A transparent or translucent rectangular area $Z_2$ is provided whose $x$ ordinate is $\pi$ units long and whose $y$ ordinate is one unit value of $y$ in the equation $y=f(x)$ of the curve 2 of Fig. 2. This standard area $Z_2$ represents the area (1 unit of $y$)·$\pi=\pi$ and when placed over the opening 12 of my device gives a galvanometer reading R. Thus (9) $\quad R = k\pi$ where $k$ is a proportionality factor.

The reading R is used as hereinafter described.

Figure 4:
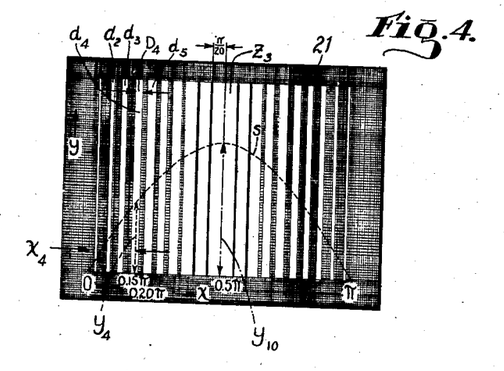
Fig. 4 illustrates a sin $x$ multiplier screen necessary for harmonic analysis of the curve of the screen of Fig. 2.

A third or sine multiplier screen (Fig. 4) 21 of the same material as the other screen is also provided. This screen 21 has a translucent or transparent rectangular area $Z_3$ whose $x$ coordinate is the same as that of the standard screen 20. In the embodiment shown, the $x$ coordinate is subdivided into 20 divisions $$\frac{\pi}{20}$$

units apart, and black areas of differing width almost centered about the respective dividing lines are provided, leaving clear or translucent rectangular areas $d$ of varying width. For example, with rectangle $d_4$, its center lies midway between $0.15\pi$ and $0.2\pi$, i. e., at $0.175\pi$ or at 31-1/2°. The sine of 31-1/2° from tables is 0.521. Therefore, rectangle $d_4$ has a width $D_4$ equal to 0.521 of the distance between $0.15\pi$ and $0.2\pi$ and centrally located therebetween. So, likewise, the clear or translucent area $d_5$ between $0.2\pi$ and $0.25\pi$ lying midway between the two points, i. e., at $0.225\pi$ would have a width determined by the sine 40-1/2° which would equal 0.648 times the distance between $0.2\pi$ and $0.25\pi$. So likewise, the width of each clear or translucent rectangle $d$ is determined.

For illustrative purposes, a sine curve S having the equation $y = \sin x$ is shown in dotted lines on the figure but does not appear on the screen itself. With the sub-divisions $$\frac{\pi}{20}$$

given, the width $D_4$ of rectangle $d_4$, (10) $\qquad D_4 = \dfrac{y_4}{y_{10}} \times \dfrac{\pi}{20}$ where $y_4$=the $y$ ordinate of the midpoint of the sine curve in rectangle $d_4$ and $y_{10}$ is the maximum ordinate of the sine curve at $x = 0.5\pi$.

The area of the clear or translucent portion of the rectangle $d_4$ under the sine curve, therefore, is:

(11) $\qquad y_4 \times D_4 = y_4 \dfrac{\pi}{20} \sin x_4$ where $x$ is the $x$ coordinate of the curve at the midpoint of the sine curve S in the rectangle $d_4$.

The general equation for the area of any clear or translucent rectangle $d_n$ under the corresponding portion of the sine curve is (12) $\qquad y_n \times D_n = y_n \dfrac{\pi}{20} \sin x_n$ or (13) $\qquad D_n = \dfrac{\pi}{20} \sin x_n$ where $n$ is any integer from 1 to 20, or more generally (14) $\qquad D_m = \dfrac{\pi}{m} \sin x_m$ where $m$ is any integer from 1 to infinity.

Measuring screen 18 and sine multiplier screen 21 are used together over the opening 12 of the device, with the first screen superposed over the second one or vice-versa, the $x$ coordinates being in register. The total translucent or clear area of the two superposed screens will be approximately $$\int_0^\pi f(x) \sin x \, dx,$$

and the galvanometer reading $R_1$ on the device will be (15) $\qquad R_1 = k \int_0^\pi f(x) \sin x \, dx$ in units of area corresponding to the framed areas of the two screens, which in turn are the same as that of the standard screen 20.

By dividing Equation 15 by Equation 9 we get (16) $\qquad \dfrac{R_1}{R} = \dfrac{k \int_0^\pi f(x) \sin x \, dx}{k\pi} = \dfrac{1}{\pi} \int_0^\pi f(x) \sin x \, dx$ which result we see is ½ the first coefficient $A_1$ (Equation 4 when $n=1$) and we quickly obtain $A_1$, by multiplying by 2. Thus (17) $\qquad A_1 = \dfrac{2R_1}{R}$ $A_1$, therefore, the coefficient of the first harmonic of the Fourier series is quickly and simply obtained by doubling the quotient of the galvanometer readings R and $R_1$ which, of course, is very much simpler than attempting the complicated mathematical computations of the Fischer-Hinnen method of analysis.

Figure 5:
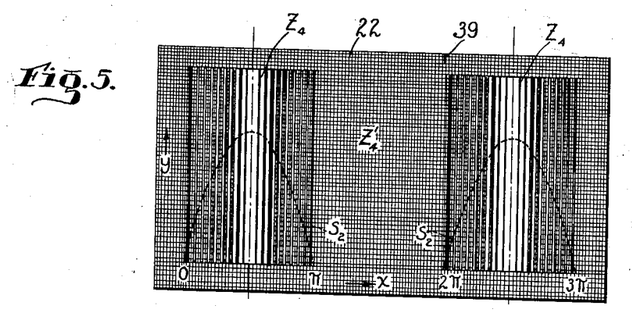
Fig. 5 illustrates a sin $2x$ multiplier screen used in the harmonic analysis of the curve of the screen of Fig. 2.

The coefficients of each of the other harmonics of the Fourier series are obtained by substituting a harmonic multiplier screen of the desired harmonic for screen 21. Thus the coefficient $A_2$ for the second sine harmonic of the Fourier series of Equations 1 or 2, is obtained by the use of a sine $2x$ multiplier screen 22 (Fig. 5) of the same material as the other screens. This screen 22 has a light transmitting or translucent, or transparent rectangular area $Z_4$ whose $x$ coordinate is one-half that of the standard screen 20. In the embodiment shown, this $x$ coordinate is subdivided into 20 divisions $$\frac{\pi}{20}$$

units apart and the same sine pattern superposed over this reduced $x$ coordinate as is spread over that of the $x$ coordinate of screen 21, the relative widths of the dark and light rectangles being one-half the relative widths of their corresponding rectangles in screen 21.

It is to be noted that the sin $2x$ is positive for one-half the span and negative for the second half. Since the sin $2x$ is a multiplier, it means that the net first half area is plus and the second half negative. To get the reading for the negative half of the sine wave, a subdivided sin $2x$ section spaced $$\frac{\pi}{2}$$

units from the first by a black area $Z^1{}_4$ is provided which is a duplicate of the area $Z_4$.

Figures 7, 8:
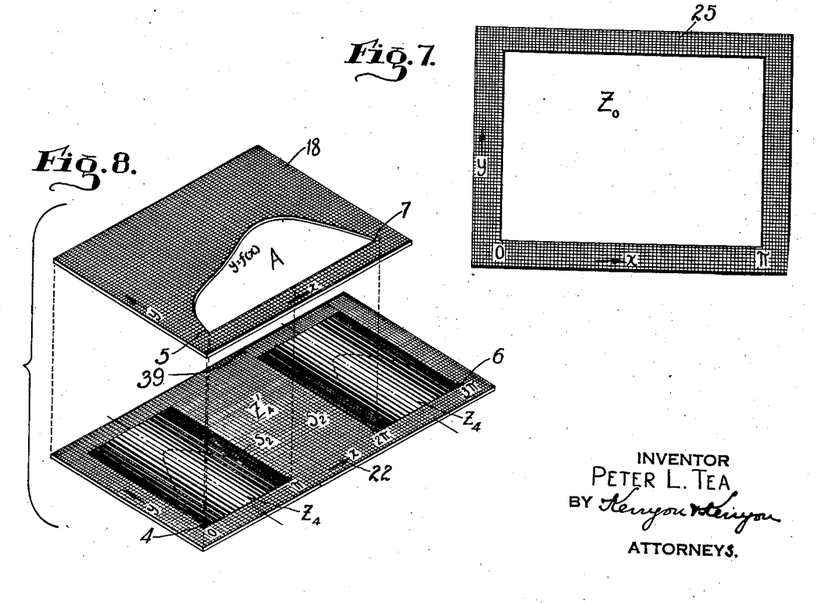
Fig. 7 illustrates a standard multiplier screen for determining the first term of the cosine functions of a Fourier series.
Fig. 8 illustrates the method of use of the sin $2x$ multiplier screen with the screen of Fig. 2, the two screens being spaced apart for clarity.

In use as illustrated in Fig. 8, this screen 22 is applied over opening 12 together with screen 18 with its left hand sin area $Z_4$ edge 4 registering with the left hand edge 5 of the area being analyzed, and the galvanometer reading $R^1{}_2$ noted. Screen 22 is then shifted to the left to bring the right hand edge 6 of the second area $Z^1{}_4$ in register with the right hand end 7 of the area being analyzed and a second galvanometer reading $R^2{}_2$ noted. Then (18) $\qquad R_2 = R^1{}_2 - R^2{}_2$ This reading represents approximately (19) $\qquad R_2 = k \int_0^\pi f(x) \sin 2x \, dx$ Then dividing Equation 19 by Equation 9 we get $$\frac{R_2}{R} = \frac{k \int_0^\pi f(x) \sin 2x \, dx}{k\pi}$$

which result we see is one-half the second coefficient $A_2$ (Equation 4 when $n=2$) and we quickly obtain $A_2$ by multiplying by 2. Thus (19A) $\qquad A_2 = \frac{2R_2}{R}$ For the higher order harmonics, for example, the third sine harmonic, an additional screen (not shown) is provided in which the $x$ span of screen 18 is subdivided into three equal parts, the center part representing the negative loop of the sin $3x$ being blackened out, and the other two areas each having the sine pattern of screen 21 reproduced therein on ⅓ scale. This screen, together with screen 18 is used to determine the coefficient $A_3$ by registered superposition therewith over the opening 12. The reading $R^1{}_3$ is noted and then the sin $3x$ screen is shifted to the left one-third its distance and the second reading $R^2{}_3$ noted. Then $$R_3 = R^1{}_3 - R^2{}_3$$

and similarly (20) $\qquad A_3 = \frac{2R_3}{R}$

Since with the higher coordinates, the width of the sine pattern is considerably reduced, it no longer becomes necessary to use 20 subdivisions as the basis for its formation. Fewer divisions may be used.

As many sine multiplier screens are provided as harmonic coefficients are desired in the analysis.

Figure 6:
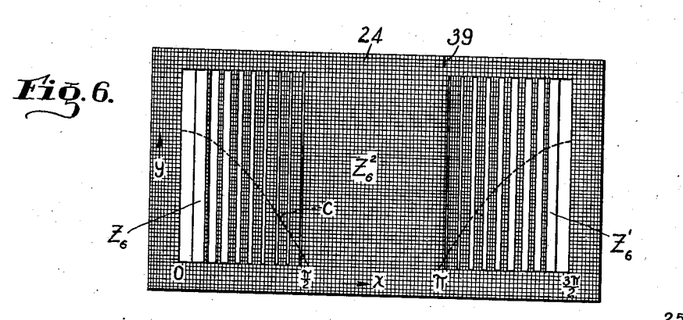
Fig. 6 illustrates a cos $x$ multiplier screen used in said harmonic analysis.

To determine the cosine coefficients, cosine multiplier screens are provided. These screens are essentially sine screens 90° out of phase with the corresponding sine screens, e. g., sin $(nx+\theta)$ where $\theta = 90°$ and $n$ is any integer. A cosine screen 24 for the first harmonic is shown in Fig. 6. Inasmuch as half the cosine loop is negative from $$x = \frac{\pi}{2} \text{ to } x = \pi$$

that portion $Z^2{}_6$ of $x$ is blackened out. The positive cosine loop is measured by the area $Z_6$ which is similar to the right half of the screen 21, and the second or negative cosine loop is measured by area $Z^1{}_6$ which is similar to the left half of the screen 21 and is reproduced adjacent the blacked out portion $Z^2{}_6$ of screen 24. Two readings are necessary to determine the cosine coefficient $B_1$. Reading $R^b{}_1$ gives the value for the positive loop and after shifting screen 24 to the right, reading $R^b{}_2$ gives the value of the negative loop.

(21) $\qquad R_b = R^b{}_1 - R^b{}_2$ whence (22) $\qquad B_1 = \frac{2R_b}{R} = \frac{k \int_0^\pi f(x) \cos x \, dx}{k\pi}$ Use of similar cosine multiplier screens constructed on the same principles as the higher harmonic sine screen multipliers but shifted 90° out of phase, enables determination of all the coefficients $B_n$ of the Fourier series desired.

To obtain the first term $B_0$ of the cosine series, a screen 25 having a framed transparent or translucent area $Z_0$ whose $x$ coordinate is the same as the $x$ coordinate of screen 21 is provided and whose $y$ coordinate is that of this latter screen. No blackened sections appear on the area $Z_0$. This screen together with screen 18 give a reading $R_0$ on the galvanometer and (23) $\qquad B_0 = \frac{2R_0}{R}$ My invention is not only adapted to area measurement and Fourier series analysis. It can also be applied to the solution of integral equations, such as (24) $\qquad F(x) = \int_a^b \psi(x) \varphi(x, X) dx$ where the $\varphi(x, X)$ is known, $F(x)$ is known, but $\psi(x)$ is unknown.

By making multiplier screens for $\varphi(x, X)$, as many as are desired to divide the $X$ range, a guess at the curve $\psi(x)$ can be made and used with all the multiplier screens in turn giving values of $F(x)$, e. g., for $F(x_1)$, $F(x_2)$, etc. Knowing the nature of the problem, I change $\psi(x)$ and repeat the process until $F(x)$ is checked.

Effectively the solution of the integral equation is the solution of a system of simultaneous algebraic equations.

Figure 9:
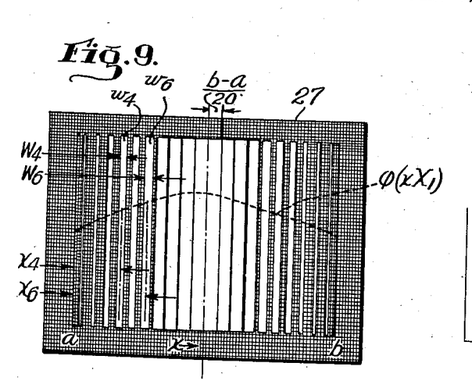
Fig. 9 illustrates a multiplier screen for use in analyzing functions into other than Fourier series.

More specifically the application of the device to obtain a numerical solution of Equation 24 for a given $F(x)$, given function $\varphi(x, X)$, which is the multiplier, $\psi(x)$ unknown, and the limits $a$ to $b$ known is as follows:

Since the multiplier $\varphi(x, X)$ contains two variables $x$ and $X$, for each value of $X$ a screen 27 representing $\varphi(x, X_m)$ is prepared. The $x$ range from $a$ to $b$ is divided for example into twenty equal parts or a corresponding number of intervals. For each value of $X$ the multiplier $\varphi(x, X_m)$ therefore changes in form. Thus twenty screens or a number corresponding to the number of subdivisions which are needed are quickly made. These multiplier screens are illustrated diagrammatically in Fig. 9 which represents say a screen for $\varphi(x, X_1)$. The curve representing this function being shown in dotted lines. There is a similar screen for each value of $X$ from $m=1$ to $m=20$. As with the sine multiplier screens hitherto described the width of any clear rectangle is determined by the value of $\varphi(x, X_m)$ at the midpoint of the particular one of the subdivisions at which it is located. Thus the width $W_4$ of rectangle $w_4$ in the illustrated screen of Fig. 9 is $\varphi(x_4 X_1)$ multiplied by one-twentieth the distance from $a$ to $b$. Similarly the width $W_6$ of rectangle $w_6$ is $\varphi(x_6 X_1)$ multiplied by one-twentieth the distance from $a$ to $b$.

The same principle of preparing the screens is used for each of the other 19 screens, to wit, $\varphi(x, X_2)$, $\varphi(x, X_3)$ ... etc., to $\varphi(x, X_{20})$.

Equation 24 can be broken up into twenty simultaneous equations as follows:

For $X_m = X_1$, I can write, (25) $F(x)/_{x=x_1} = \dfrac{b-a}{20} [\psi(x_1)\,\varphi(x_1 X_1) + \psi(x_2)\,\varphi(x_2 X_1) + + \text{etc.} + \psi(x_{20})\varphi(x_{20} X_1)]$ (twenty terms)

For $X_m = X_2$, I can write, (26) $F(x)/_{x=x_2} = \dfrac{b-a}{20} [\psi(x_1)\,\varphi(x_1 X_2) + \psi(x_2)\,\varphi(x_2 X_2) + + \text{etc.} + \psi(x_{20})\varphi(x_{20} X_2)]$ (twenty terms)

The $$\frac{b-a}{20}$$

corresponds to $\Delta x$.

In each of these equations the values of $\psi(x_1)$, $\psi(x_2)$, $\psi(x_3) - \psi(x_{20})$ are unknown but the function $\varphi(x, X_m)$ is known and hence the values of $\varphi(x_1 X_1)$, $\varphi(x_2 X_1)$, $\varphi(x_1 X_2)$, $\varphi(x_2 X_2)$, $\varphi(x_1 X_3)$, etc., are all known.

There are thus twenty unknowns and twenty simultaneous equations so that a mathematical solution by usual computations could be made. The numerical work, however, would probably take a great deal of time, a week or more. Even one error anywhere in the computations which could not be found except by complicated checking would require recalculation of the entire problem.

With multiplier screens 27 prepared for the known functions as indicated, I can use my device 10 for obtaining numerical solutions for $F(x)$ of which $\psi(x)$ is the unknown. This method it will be noted leads to a device which solves a series of simultaneous equations. For example, if the problem leading to the integral Equation 24 is known, a good sense of the form of the unknown $\psi(x)$ is quickly obtained by solving some simplified form of the problem. With this solution a good guess can be made of the $\psi(x)$ for the problem.

Figure 10:
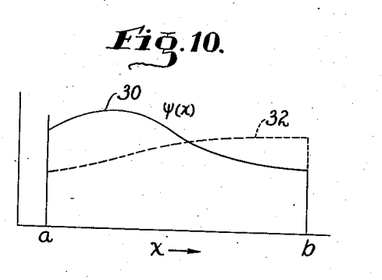
Fig. 10 illustrates a curve representing the unknown function of a complex function.
Figure 11:
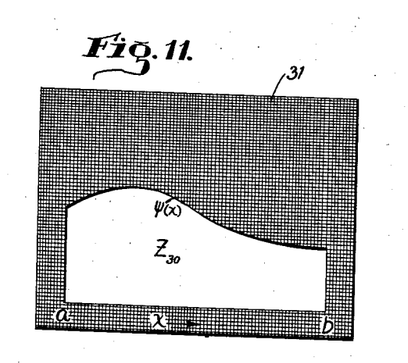
Fig. 11 illustrates a screen having a light transmitting area proportional to that under the curve of Fig. 10 which is adapted to be used with multiplier screens of the type illustrated in Fig. 9 for determining said unknown function as will hereinafter be described.
Figure 12:
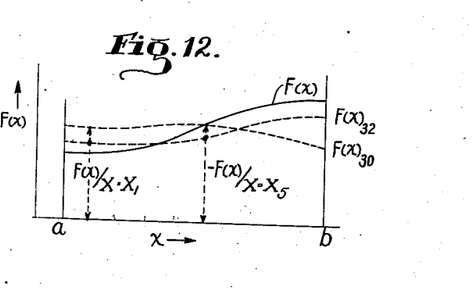
Fig. 12 illustrates the curve of complex function consisting of the unknown function of the curve of Fig. 10 and known functions and approximations of said complex function arrived at during the analysis of said unknown function as will hereinafter be described.

Assume, for example, that curve 30 of Fig. 10 is guessed. A screen 31 is prepared (Fig. 11) having the cut out, transparency or translucency $Z_{30}$ with the limits $a$ and $b$ on the same scale as the multiplier screens 27 of Fig. 9 along the $(x_1 X)$ coordinate and whose upper border corresponds to the curve $\psi(x)$ within those limits. This screen 31 is then superposed upon each of the twenty $\varphi(x, X_m)$ screens in my device 10 and the twenty separate galvanometer readings noted. These readings correspond relatively to $F(x)/_{x=x_1};\ F(x)/_{x=x_2};\ -F(x)/_{x=x_{20}}$ The known curve $F(x)$ is plotted or drawn with $F(x)$ as ordinate and $x$ as abscissa Fig. 12. Since there is a relationship between $x$ and $X_m$ the galvanometer reading using each $X_m$ screen in turn with screens 31 gives a value of the $F(x)$ for that value of $X_m$ and hence at a known point $x$ on the $F(x)$ curve. Thus the 20 readings give 20 known points for a curve which can be plotted on the ordinate and abscissa scale of Fig. 12, yielding the curve $F(x)_{30}$ which represents the solution with the assumed $\psi(x)$ curve 30 of Fig. 10. This curve does not check with the $F(x)$ curve of the Fig. 12 and indicates that the guess as to $\psi(x)$ was not correct.

A second guess therefor as to $\psi(x)$ is made represented by curve 32 in Fig. 10. A screen is prepared similar to screen 31 but whose light transmitting, translucent or transparent area corresponds to the area under curve 32 between the limits $a-b$, and this screen is used with each multiplier screen $\varphi(x, X_m)$ to give twenty new readings of the galvanometer representing new values for $F(x)/_{x=x_1}$ to $F(x)/_{x=x_{20}}$. Then new values may be plotted on Fig. 12 yielding the curve $F(x)_{32}$. If this curve and the curve $F(x)_{30}$ are close to the curve $F(x)$ then by interpolation, a very close third guess to $\psi(x)$ can be made and a screen prepared for it. Repetition of guesses as to $\psi(x)$ are made and screens prepared therefor until the curve obtained by a combination of the guessed $\psi(x)$ and the multiplier screens 27 yields a plotted curve in Fig. 12 which corresponds to the known $F(x)$. That $\psi(x)$ screen represents the solution to the problem.

Thus it is seen that my device has application to the solution of integral equations by the use of multiplier screens 27 prepared as indicated and by the use additionally of screens prepared to represent the unknown function. While essentially a trial and error procedure is involved, the solution is quicker than that necessitated by mathematical computations and the only sources of error, which can be quickly checked and corrected, are in the preparation of the screens.

If $\varphi(x, X_m)$ should be greater than 1 anywhere in any rectangle in the preparation of the screens and for any value of $X_m$, both sides of Equation 24 can be divided by the largest value that $\varphi(x, X_m)$ can have without altering the nature of the problem. Then the scale for the $F(x)$ is reduced by the same factor without affecting $\psi(x)$. As an alternative the quantity of light to each rectangular portion of the multiplier screen can be controlled individually.

The application of the principles of my invention is not limited to the use of screens and a photo-cell device. A planimeter may be used to determine the coefficients of the Fourier series, for example, as follows.

The curve to be measured is drawn to a given scale. Double its area divided by $\pi$ as determined by a planimeter immediately gives the value of $B_0$, Equation 6.

A second curve with the same $y$ coordinates but its $x$ coordinate reduced by the sin $x$ is drawn and its area measured by a planimeter. This area multiplied by $$\frac{2}{\pi}$$

gives the value of A, Equation 4.

Additional curves for each harmonic each having its $x$ coordinate reduced by the corresponding harmonic value sin $nx$ is drawn and by measuring the areas under the said curves by a planimeter, accounting of course for the positive and negative parts, and multiplying the net areas by $$\frac{2}{\pi}$$

gives the respective coefficients.

Similarly curves for the cosine harmonics may be prepared in which the $x$ coordinates are reduced by the value of the cosine $nx$ and thus the cosine coefficients determined.

For the screen system, to facilitate operation, suitable guideways 38 (Fig. 1) may be provided adjacent the opening 12 in which the screens may be slidably mounted. Indicator marks 39 on the screens, for example, serve to denote the relative position of the screens over the opening 12 during the measuring process.

In connection with the trigonometric multiplier screens there is a particular advantage in multiplying the width $D_n$ by the fraction of unity, i. e., by the sin $x_n$ or cos $x_n$ or the like, instead of the particular ordinate $y_n$ of the trigonometric curve in that the multiplier screens thus become good for any curve. One and the same pattern screen 18 can be used with the different multiplier screens.

I do not restrict this invention to the screen patterns shown as black lines. A pattern of dots of varying size and shape, but uniform for the screen series above for any value $x$ could be placed on the light passing portions of the screens to give the trigonometric multiplier effects. By making a fine screening, as by the half tone printing process, of an original well graded drawing, where the shades of gray to black at one end, and white at the other follows the law, for example of sines or cosines, I can effectively obtain the effect of much more than 20 divisions between 0 and $\pi$ on the $x$ coordinate and hence secure greater integration accuracy. Furthermore, the limit of $x$ between zero and $\pi$ can be extended or reduced to any desired sets of limits. The same type of dot patterns can be used to prepare the $\varphi(x, X_m)$ multipliers.

Furthermore the device is not limited to determination of plane areas. It can be used with equal effectiveness to measure light quantities and thereby areas or effective projected areas on a sphere, i. e., solid angles from surfaces in any position, continuous or discontinuous, from which there issues a direct light or lights, and/or reflected lights spread over such surfaces at a uniform or non-uniform density. The light measured may be varying and its instantaneous impulse, mean effective, be recorded, or continuously recorded.

In addition, my device is not limited to use in harmonic and functional analysis or to integration of functions herein mentioned. The principles may be effectively applied to other types of problems than those specifically exemplified by the use of appropriate multiplier devices prepared in the general manner indicated.

My invention may be varied in many other details without departing from the spirit thereof, and therefore I do not wish to be limited to the details shown and described.

I claim:

1. In an area measuring device having light responsive means and a source of constant light, a differential screen adapted to be interposed between said means and said light, said screen comprising a black opaque body having a translucent area which is rectangular in shape and traversed by opaque rectangles leaving parallelly arranged translucencies whose widths are equal to a uniform fractional division of the total $x$ coordinate of the rectangle area multiplied by the sin $x$ at the midpoint of each translucence.

2. A harmonic analyzer for determining the coefficients of a Fourier series comprising means for determining the area under a curve to be analyzed, said means comprising a screen having an opaque region and a uniformly translucent region, the latter region representing to the area under said curve, means to multiply the said area by a trigonometric multiplier of the order of harmonic being determined, said multiplying means comprising a screen having a translucent area traversed by opaque parallel rectangles leaving parallelly arranged translucencies whose widths are equal respectively to a uniform fractional division of the total abscissa span of the said translucent area multiplied by the particular value of the desired trigonometric multiplier at the midpoint of each translucence and screen means having a translucent rectangular area whose abscissa span corresponds to that of said curve in said first-named screen and whose ordinate span corresponds to one unit value of the ordinate scale of said curve for ascertaining a standard area to be used as the divider of said multiplied area whereby the harmonic coefficients of said series may be obtained.

3. Apparatus for determining the coefficients of a Fourier series expression for a curve $y=f(x)$ including indicating means, light responsive means for operating said indicating means, a light source, means having a translucent region and an opaque region adapted to be interposed between said light source and said responsive means for intercepting light passing from said source to said responsive means, one of said regions having an area representing that under said curve, whereby the reading on said indicating means is proportional to the area under said curve, and additional intercepting means adapted to be used together with said first named intercepting means and serving as a trigonometric multiplier of the area under said curve, said additional intercepting means including a uniformly translucent area traversed by parallelly arranged spaced opaque rectangles leaving parallelly arranged translucencies whose widths are equal respectively to a uniform fractional division of the abscissa span of said translucent area multiplied by the particular value of the required trigonometric function at the midpoint of each translucence, whereby when said two intercepting means are used together the reading on said indicating means is proportional to the prduct of said area under said curve and said trigonometric function.

4. Apparatus for analyzing a curve $y=f(x)$ where $x$ itself is a function of one or more variables, including indicating means, light responsive means for operating said indicating means, a light source, means having a translucent region and an opaque region adapted to be interposed between said light source and said responsive means for intercepting light passing from said source to said responsive means, one of said regions having an area representing that under said curve, whereby the reading on said indicating means is proportional to the area under said curve, and additional intercepting means adapted to be used together with said first named intercepting means and serving as a mathematical function multiplier of the area under said curve, said additional intercepting means including a uniformly translucent area traversed by parallelly arranged spaced opaque rectangles leaving parallelly arranged translucencies whose widths are equal respectively to a uniform fractional division of the abscissa span of said translucent area multiplied by the particular value of the required mathematical multiplier function at the midpoint of each translucence, whereby when said two intercepting means are used together the reading on said indicating means is proportional to the product of said area under said curve and said multiplier function.

5. A screen for use in a light controlled curve analyzer serving as a particular trigonometric function multiplier and including an opaque area having minimum light reflection characteristics and a light transmitting area traversed by opaque areas to form rectangular subdivisions of light transmitting areas whose respective widths are proportional to the value of the said particular trigonometric function at the midpoints of the respective subdivisions.

6. A screen for use in a light controlled curve analyzer serving as a multiplier and including an opaque area having minimum light reflection characteristics and a light transmitting area traversed by opaque areas to form subdivisions of light transmitting areas, whose respective widths are proportional to the value of sin $(nx+\theta)$ at the midpoints of the respective subdivisions.

7. A screen for use in a light controlled curve analyzer serving as a sine multiplier and including an opaque area having minimum light reflection characteristics and a light transmitting area traversed by opaque areas to form subdivisions of light transmitting area whose respective widths are proportional to the value of the sine function at the midpoints of the respective subdivisions.

8. A screen for use in a light controlled curve analyzer serving as a cosine multiplier and including an opaque area having minimum light reflection characteristics and a light transmitting area traversed by opaque areas to form subdivisions of light transmitting areas whose respective widths are proportional to the value of the cosine function at the midpoints of the respective subdivisions.

9. A method of harmonic analysis to determine the coefficients of a Fourier series expression for a curve $y=f(x)$ including measuring an area representing that under said curve by intercepted light, mechanically multiplying said measured area by a trigonometric function of the order of harmonic coefficient desired, measuring said multiplied area by intercepted light, and dividing the value of the latter mathematically by a constant $k\pi$ whereby the desired harmonic coefficient is determined.

10. In an area measuring device having light responsive means, and a source of uniform light, a differential screen adapted to be interposed between said means and said light, said screen comprising a black, opaque body having a translucent area which is rectangular in shape and traversed by opaque rectangles leaving parallelly arranged translucencies whose widths are equal to a uniform fractional division of the total coordinate along the $x$ axis of the rectangular area multiplied by a function of $x$ whose value is that at the midpoint of each respective translucence.

11. Apparatus for analyzing a curve $$F(x)=\int_a^b \psi(x)\varphi(x, X_m) dx$$

wherein $\psi(x)$ is the unknown, including indicating means, light responsive means for operating said indicating means, a light source, means having a translucent region and an opaque region adapted to be interposed between said light source and said responsive means for intercepting light passing from said source to said responsive means, one of said regions having an area representing that under $\psi(x)$ between the limits of the integral, whereby the reading on said indicating means is proportional to the area under the curve representing $\psi(x)$ between the limits of the integral, and aditdional intercepting means, one for each required value of $X_m$, $m$ being any integer, each; adapted to be used together with said first named intercepting means and serving as $\varphi(x,X_m)$ multipliers of said area, each of said additional intercepting means including a uniformly translucent area traversed by parallelly arranged spaced opaque rectangles leaving parallelly arranged translucencies whose widths are equal respectively to a uniform fractional division of the abscissa span of said translucent area multiplied by the required particular value of $\varphi(x,X_m)$ at the midpoint of each translucence, whereby the area under the curve $$F(x)=\int_a^b \psi(x)\varphi(x, X_m) dx$$

for each value of $X_m$ may be determined, $m$ being any integer.

12. In a method of determining the unknown function of a complex function whose other elements are known the steps including approximating the curve of the unknown function, measuring an area representing that under said approximated curve by transmitted light proportional to said area, mechanically multiplying the said area representing said approximated unknown function by an area representing said known function and then measuring the area representing the product of said known and approximated unknown function by transmitted light proportional to the product of said areas.

13. A method of harmonic analysis to determine the coefficients of a Fourier series expression for a curve $y=f(x)$ including providing a screen having a translucent area defined by the $x$ and $y$ coordinates and the said curve over a fixed period thereof, and screens having net uniformly translucent areas corresponding to trigonometric functions, applying each of the second screens separately in juxtaposition with the said first-named screen to mechanically multiply said defined area by the trigonometric function of the respective screens applied to said first-named screen, measuring the respective products of said mechanical multiplications by transmitted light and dividing the latter said products by a constant to determine the desired harmonic coefficients.

14. A method for harmonic analysis to determine the coefficients of a Fourier series expression for a curve $y=f(x)$ including the steps of providing a standard screen having a constant area of uniform translucence, a second screen having a uniformly translucent area defined by the $x$ and $y$ coordinates between a length corresponding to the same length as said standard area and the said curve and screens having net uniformly translucent areas corresponding to trigonometric functions to serve as multiplier screens, interposing said standard area between a uniform light source and a light-responsive device and determining the value of said standard area by a galvanometer reading on a galvanometer associated with said light-responsive device, substituting said second-named area and one of said trigonometric screens in alignment with each other between the light-responsive device and the said light source and determining the galvanometer reading corresponding to the mathematical product of said second area and the trigonometric function of said last-named interposed screen, and dividing double the value of said second reading by said first reading to obtain a harmonic coefficient of said Fourier series.

15. In a method for harmonic analysis to determine the higher order coefficients of a Fourier series expression for a curve $y=f(x)$, including providing a uniform translucence of standard area having a constant length, a second uniform translucence defined by the $y$ coordinates of said curve between a length corresponding to that of said standard area length and said curve, and a translucent screen having net uniformly translucent areas corresponding to a trigonometric function above the first order harmonic, interposing said standard translucence between a uniform light source and a light-responsive device and determining the galvanometer reading on a galvanometer associated with said light-responsive device, interposing said second uniform translucence and said trigonometric function translucence aligned with respect to their $y$ coordinates at their lowest $x$ values, between said light source and said light-responsive means, determining the galvanometer reading resulting from said last-named interposition, shifting said trigonometric translucence along the $x$ axis thereof a distance directly proportional to the inverse value of the order of harmonic of said trigonometric translucence, and determining the resultant galvanometer reading, subtracting the last-named reading from said second reading, multiplying the difference by two and dividing said multiplied difference by the value of said first-named reading.

16. In an area measuring device having a light-responsive means and a source of uniform light, a differential screen adapted to be interposed between said means and said light, said screen comprising a substantially black opaque body having a translucent area traversed by parallelly arranged opaque rectangles leaving parallelly arranged translucencies whose widths are equal respectively to a uniform fractional division of the total abscissa span of said area multiplied by the particular value of a required mathematical function at the midpoint of each translucence.

17. In an area measuring device having light responsive means and a source of constant light, a differential screen adapted to be interposed between said means and said light, said screen comprising a black opaque body having a translucent area which is rectangular in shape and traversed by opaque rectangles leaving parallelly arranged translucencies whose widths are equal to a uniform fractional division of the total $x$ coordinate of the rectangle area multiplied by the cos $x$ at the midpoint of each translucence.

18. In an area measuring device having light responsive means and a source of constant light, a differential screen adapted to be interposed between said means and said light, said screen comprising a black opaque body having a translucent area which is rectangular in shape and traversed by opque rectangles leaving parallelly arranged translucencies whose widths are equal to a uniform fractional division of the total $x$ coordinate of the rectangle area multiplied by the particular required value of $\varphi(x, X_m)$ at the midpoint of each translucence.

19. A screen for use in a light controlled curve analyzer serving as a particular mathematical function multiplier and including an opaque area having minimum light reflection characteristics, and a light transmitting area traversed by opaque areas to form subdivisions of light transmitting areas whose widths are proportional respectively to the particular value of said mathematical function at the midpoints of the respective subdivisions.

20. A screen for use in a light controlled curve analyzer serving as a multiplier and including an opaque area having minimum light reflection characteristics and a light transmitting area traversed by opaque areas to form subdivisions of light transmitting areas, whose respective widths are proportional to the value of the required $\varphi(x, X_m)$ with the chosen integer $m$ at the midpoints of the respective subdivisions.

PETER L. TEA.